(12) United States Patent
Slutsky et al.

(10) Patent No.: US 7,494,064 B2
(45) Date of Patent: Feb. 24, 2009

(54) ASIC FOR SUPPORTING MULTIPLE FUNCTIONS OF A PORTABLE DATA COLLECTION DEVICE

(75) Inventors: Michael Slutsky, Stony Brook, NY (US); Daniel B. De Lazari, Ribeirao Preto (BR); Joseph Cabana, Centereach, NY (US); Dominick Salvato, North Salem, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 976 days.

(21) Appl. No.: 10/034,072

(22) Filed: Dec. 28, 2001

(65) Prior Publication Data

US 2003/0121981 A1    Jul. 3, 2003

(51) Int. Cl.
  *G06K 7/10*    (2006.01)
(52) U.S. Cl. .......................... 235/472.01; 235/462.01; 235/462.15
(58) Field of Classification Search ............ 235/462.01, 235/462.15, 462.24, 472.01, 462.45
  See application file for complete search history.

(56) References Cited

U.S. PATENT DOCUMENTS

| | | | | |
|---|---|---|---|---|
| 4,418,277 A | * | 11/1983 | Tremmel et al. | 235/472 |
| 4,910,794 A | * | 3/1990 | Mahany | 235/472 |
| 5,029,183 A | * | 7/1991 | Tymes | 235/472 |
| 5,031,098 A | * | 7/1991 | Miller et al. | 235/383 |
| 5,195,183 A | * | 3/1993 | Miller et al. | 235/472 |
| 5,330,370 A | * | 7/1994 | Reddersen et al. | 235/472 |
| 5,349,678 A | * | 9/1994 | Morris et al. | 235/472 |
| 5,425,051 A | * | 6/1995 | Mahany | 235/472 |
| 5,525,788 A | | 6/1996 | Bridgelall et al. | |
| 5,557,777 A | | 9/1996 | Culbert | |
| 5,722,412 A | * | 3/1998 | Pflugrath et al. | 600/459 |
| 5,756,981 A | | 5/1998 | Roustaei et al. | |
| 5,875,415 A | * | 2/1999 | Lieb et al. | 702/122 |
| 5,905,249 A | * | 5/1999 | Reddersen et al. | 235/462 |
| 5,992,744 A | * | 11/1999 | Smith et al. | 235/462.11 |
| 6,058,304 A | * | 5/2000 | Callaghan et al. | 455/422.1 |
| 6,109,528 A | * | 8/2000 | Kunert et al. | 235/472.01 |
| 6,144,976 A | | 11/2000 | Silva et al. | |
| 6,175,517 B1 | | 1/2001 | Jigour et al. | |

(Continued)

FOREIGN PATENT DOCUMENTS

DE    100 05 528 A1    7/2001

(Continued)

OTHER PUBLICATIONS

European Search Report, EP 02 02 8992, mailed Apr. 2, 2004.

(Continued)

*Primary Examiner*—Ahshik Kim
(74) *Attorney, Agent, or Firm*—Amin, Turocy & Calvin, LLP

(57) ABSTRACT

A portable bar code reading terminal includes an ASIC having circuitry for both a laser scanner and an imager. The terminal also includes a data blender for distributing data from multiple sources to multiple destinations based on the type and/or content of the data. The ASIC further provides circuitry for at least one of the following functions: power management, wake up control and power down, critical suspend shutdown, warm and cold boot functions, serial ports, matrix keyboard scanning, analog converters, touch panel, modular memory IDE interface, imaging support, finger print reader, USB host, and a magnetic stripe interface.

19 Claims, 8 Drawing Sheets

U.S. PATENT DOCUMENTS

| | | |
|---|---|---|
| 6,185,316 B1 | 2/2001 | Buffam |
| 6,195,053 B1 | 2/2001 | Kodukula et al. |
| 6,264,106 B1 | 7/2001 | Bridgelall |
| 6,293,467 B1 | 9/2001 | Reddersen et al. |
| 6,345,765 B1 | 2/2002 | Wiklof |
| 6,561,428 B2 * | 5/2003 | Meier et al. ............ 235/462.25 |
| 6,585,159 B1 * | 7/2003 | Meier et al. ............ 235/462.31 |
| 6,694,356 B1 * | 2/2004 | Philyaw ..................... 709/217 |
| 6,761,316 B2 * | 7/2004 | Bridgelall et al. ...... 235/462.46 |
| 2001/0003178 A1 | 6/2001 | Chen et al. |
| 2001/0030850 A1 | 10/2001 | Ditzik |
| 2003/0127519 A1 * | 7/2003 | Ehrhart et al. .............. 235/469 |

FOREIGN PATENT DOCUMENTS

| | | |
|---|---|---|
| EP | 0 910 032 A2 | 4/1999 |
| EP | 1 020 810 A2 | 7/2000 |
| GB | 2 346 039 A | 7/2000 |
| WO | WO 01/45061 A2 | 6/2000 |
| WO | WO 01/20478 A2 | 3/2001 |
| WO | WO 01/93184 A2 | 12/2001 |

OTHER PUBLICATIONS

Manfred Seifart, "Digitale Schaltungen", Mar. 1, 1998, pp. 139-140, Verlag Technik, Berlin, Germany.

International Search Report, EP 02 02 8992, mailed Dec. 17, 2003.

* cited by examiner

ASIC FOR SUPPORTING MULTIPLE FUNCTIONS OF A PORTABLE DATA COLLECTION DEVICE

FIELD OF THE INVENTION

The present invention generally relates to Application Specific Integrated Circuit (ASIC) devices. In particular the present invention relates an ASIC device for supporting multiple functions of a portable data collection device.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes. Various bar code dataform readers can be used for portable data collection devices including laser scanners and one dimensional (1D) charge coupled device (CCD) imaging assemblies, both of which are capable of reading 1D bar code dataforms and two dimensional (2D) bar code dataforms.

The demand for such portable data collection devices has increased dramatically over the years. Moreover, the demand for customized features associated with employment of these devices has increased as well.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for an Application Specific Integrated Circuit (ASIC) employable in connection with a hand held portable electronic data collection device. According to one aspect of the present invention, the hand held portable electronic device is a bar code reading terminal that supports 1D and 2D scanning. An ASIC for a bar code reading terminal is designed to incorporate many features that conventionally required external circuitry and, thus, additional space of a printed circuit board.

Thus, according to one aspect of the present invention, a portable data collection system is provided. The portable data collection system includes a bar code reading terminal and an ASIC. The ASIC comprises circuitry for communicating with a laser scanner and an imager and for implementing at least three of the following functions: power management; wake up control and power down; critical suspend shutdown; warm boot and cold boot; serial port for WAN radio; matrix keyboard scanning; IP security; analog converters; touch panel; smart and dumb batteries; modular memory IDE interface; imaging support; fingerprint reader; USB host; and/or magnetic stripe interface.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
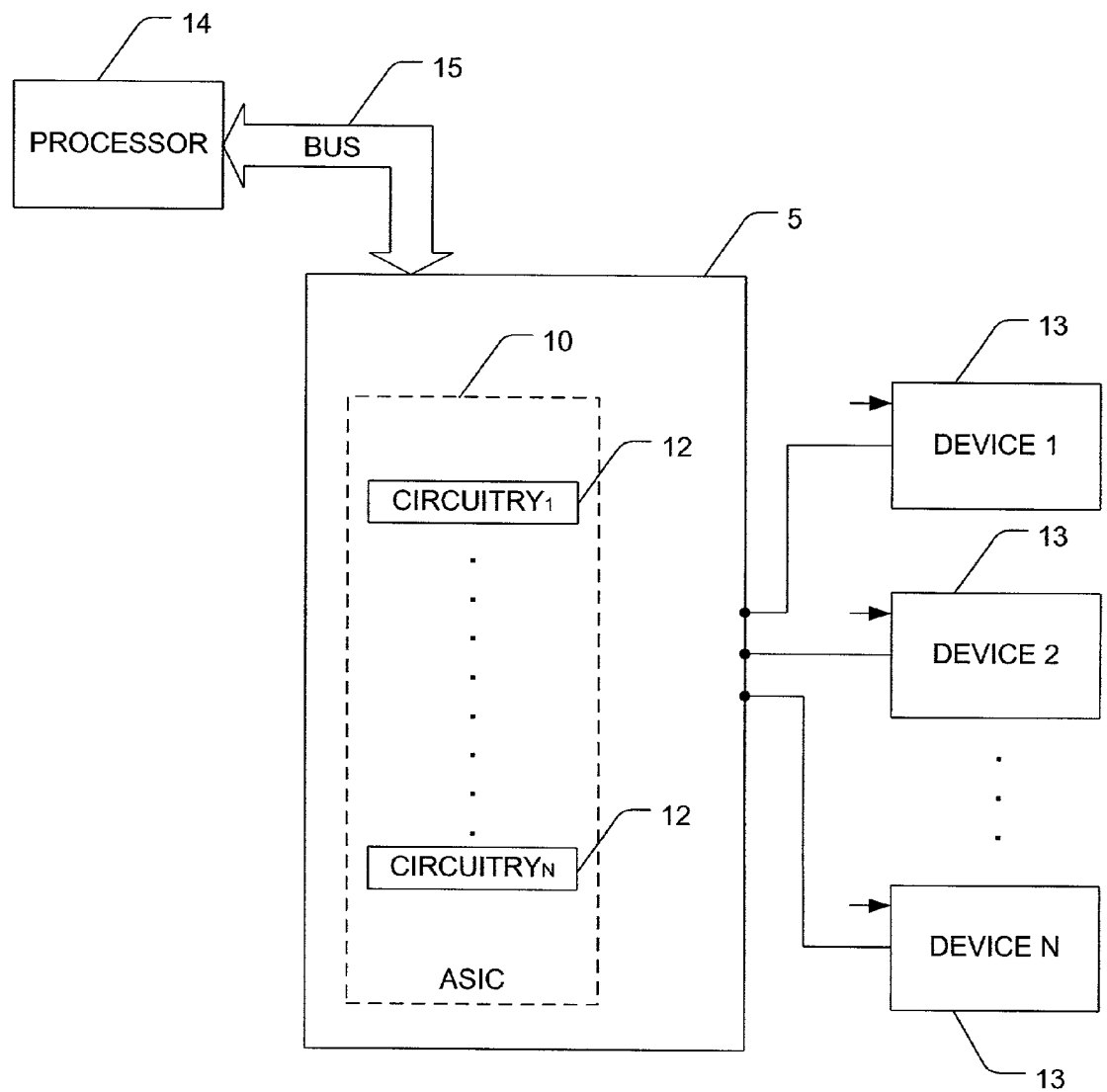
FIG. 1 illustrates a high-level schematic illustration of a portable bar code reading terminal employing an ASIC in accordance with one aspect of the present invention.

The present invention will now be described with reference to the drawings, wherein like reference numerals are used to refer to like elements throughout.

The present invention provides an Application Specific Integrated Circuit (ASIC) for a hand held portable electronic device. According to one aspect of the present invention, the hand held portable electronic device is a bar code reading terminal that supports 1D and 2D scanning. Applications for scanning and receiving bar codes are virtually unlimited, and the present invention provides a straightforward, low cost approach for processing these applications. ASICs are employed to reduce board space requirements, reduce development cost, increase reliability, maximize performance, and provide security for new designs. ASIC technology allows the integration of complex functions such as microprocessors and peripherals, coupled with memory, on the same chip. An ASIC for a bar code reading terminal, in accordance with one aspect of the present invention, is designed to incorporate many features that typically require external circuitry and, thus, additional space of a printed circuit board. The extra printed circuit board increases capacitance to the AC power line. Thus, since the ASIC incorporates many circuits into a single integrated circuit, the circuit ground is minimized and the capacitive coupling to the AC power lines is reduced.

FIG. 1 is a high-level schematic illustration of a portable bar code reading terminal 5 employing an ASIC 10 having circuitry 12 for carrying N number of functions (N being an integer). The terminal is coupled to M number of devices 13 (M being an integer), such as an imager, a laser scanner, a fingerprint reader, etc. The terminal is also coupled to a processor 14 through a common bus 15. This provides a shared data path into the system memory from the devices 13 and also a common hardware path from the ASIC 10 to the system memory. Thus, data decoded off line can be processed on the local terminal later while allowing a user to proceed with the current task. The ASIC 10 further supports common communication between the devices 13. For example, conventionally, imagers were interfaced serially through a communication channel separate from scanners. The decoding for the imager was done outside of the system and data was then brought into the system. According to one aspect of the present invention, the ASIC 10 has the circuitry to talk to each of the different devices, thus, all of the communications can occur inside the bar code reading terminal 5, without the need for separate communication channels.

Furthermore, in conventional systems, two completely different sets of hardware and software were used to route data from an imager and data from a scanner to a system. According to an aspect of the present invention, the ASIC 10 interfaces with both an imager and a scanner and routes the data from the two devices to the bar code reading terminal 5. Thus, one software driver can handle both types of devices. It is to be appreciated that the ASIC 10 can also interface with other data types and input devices, such as biometrics, magstripe, RFID, etc.

Figure 2:
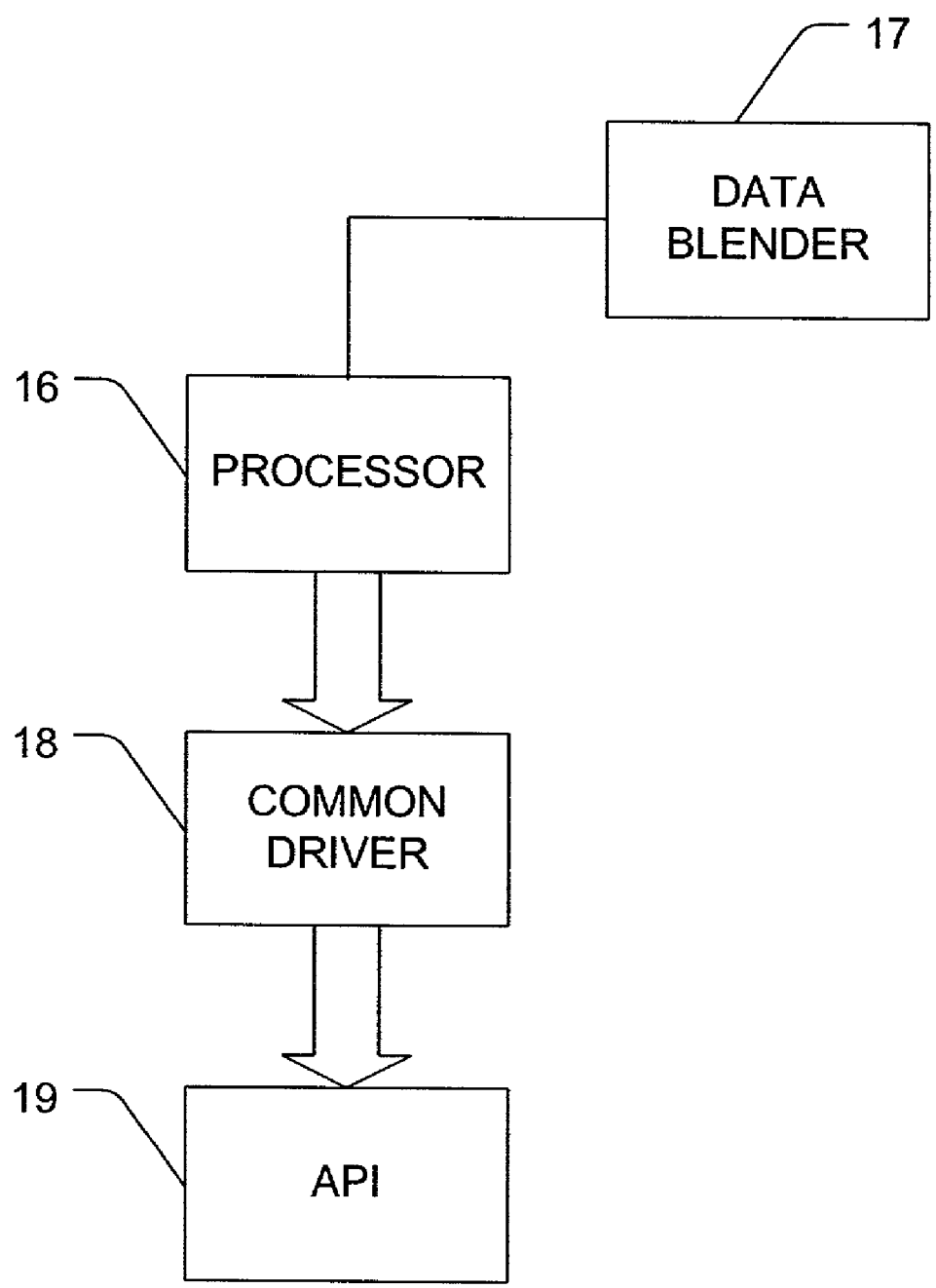
FIG. 2 illustrates a high-level schematic illustration of a processing system for a portable bar code reading terminal in accordance with one aspect of the present invention.

Turning now to FIG. 2, the data from the devices 13 is sent to a processor 16, which in turn, sends the data to a data blender 17. The data blender 17 provides the ability to take data from multiple sources and distribute the data to different destinations based on the type and/or content of the data. Thus, since data from the imager and data from the scanner is routed through the same hardware and possibly the same driver, the data blender 17 operates to determine what each piece of data is and where it is coming from. The data blender 17 then determines where the data should be routed next. Also coupled to the processor 16 is common driver 18, which is coupled to a common application programming interface (API) 19. The API 19 can allow applications to communicate with selected sources of data regardless of the type or location of the data source.

Figure 3:
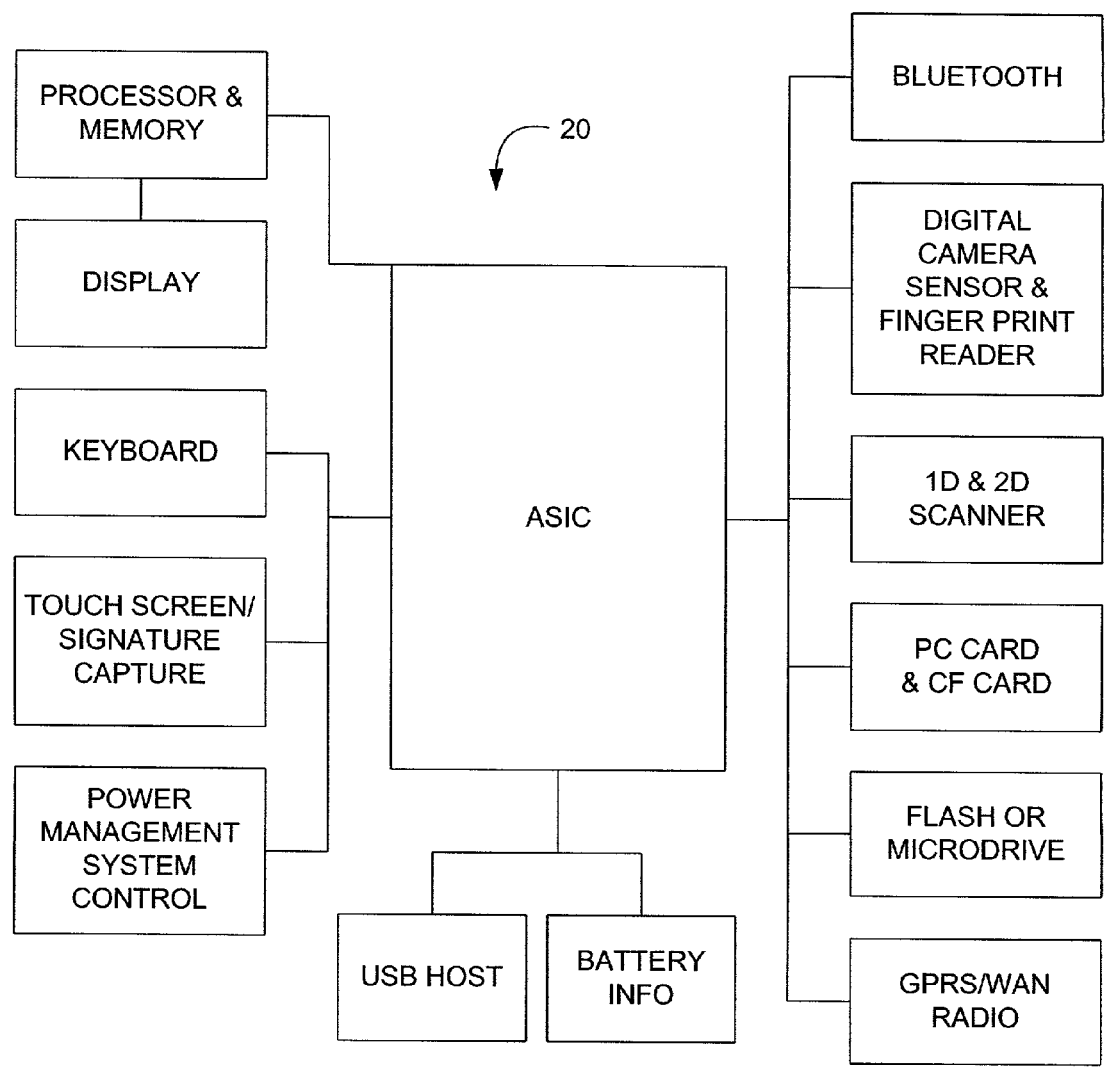
FIG. 3 illustrates a schematic block diagram of an ASIC for a portable bar code reading terminal in accordance with one aspect of the present invention.

FIG. 3 schematically illustrates an exemplary version of the ASIC. The ASIC 20 herein described provides circuitry for implementing a plurality of the following functions, each of which will be described in further detail below Power Management, Power Control
Wake up Control and Power Down
Critical Suspend Shutdown
Warm Boot and Cold Boot Functions
Serial Ports for RF Communication
Matrix Keyboard Scanning
IP Security Hardware
Analog Converters, AC In and Power Good
Touch Panel
Battery (Smart and Dumb)
    Gas Gauging
    Cycle Life
    Charge Control
Modular Memory IDE Interface -continued NAND Memory
CF Cards
Imaging Support
Finger Print Reader
USB Host
Magnetic Stripe Interface Having an ASIC 20 with such capabilities provides flexibility in manufacturing and assembly operations. For example, one ASIC design can be manufactured and employed in a plurality of different terminals, regardless of the terminal's designed application.

Power Management

The bar code reading terminal includes a power management system that determines when the device or system meets a predefined inactivity level, and then powers the device down partially or fully. For instance, the predefined inactivity level might be defined as no execution of application programs and receipt of no external event signals (e.g., keystrokes or mouse movement signals from a user interface, or change in the status of another device that is being monitored by the system in question) for a specified period of time. The manner of powering the device down when the power management software detects the predefined inactivity level can vary greatly from system to system and component to component.

There are generally four power management states in the bar code reading terminal: a normal operating state, a standby state, a sleep state, and an off state. The normal operating state is similar to the normal operating state of a typical desktop computer. One difference is the presence of a power management driver, which runs in the background (in the BIOS and the operating system), transparent to the user. The portion of the power management driver in BIOS communicates with the OS driver. The OS driver and the BIOS routines together control the computer's transition to and from the other three states.

The second state, the standby state, uses less power than the normal operating state, yet leaves any applications executing as they would otherwise execute. In general, power is conserved in the standby state by placing devices in their respective low-power modes. For example, power is conserved in the standby state by ceasing the revolutions of a fixed disk within the hard drive and by ceasing the generation of a video signal.

The third state is the sleep state. In the sleep state, the bar code reading terminal consumes an extremely small amount of power. The power consumed is small enough to maintain the circuitry that monitors the switch from a battery inside the bar code reading terminal (when the system is not receiving AC power) or a small enough to generate power at an auxiliary power line by the power supply (when the system is receiving AC power).

This small use of power is accomplished by saving the state of the bar code reading terminal to the fixed disk storage device (the hard drive) before the power supply is turned "off." To enter the sleep state, the system can interrupt executing code and transfer control of the bar code reading terminal to the power management driver. The power management driver ascertains the state of the bar code reading terminal and writes the state of the terminal system to the fixed disk storage device. The state of the CPU registers, the CPU cache, the system memory, the system cache, the video registers, the video memory, and the other devices' registers are all written to the fixed disk. The entire state of the system is saved in such a way that it can be restored without the code applications being adversely affected by the interruption. The bar code reading terminal then writes data to the non-volatile CMOS memory indicating that the system was suspended. Lastly, the bar code reading terminal causes the power supply to stop producing power. The entire state of the terminal is safely saved to the fixed disk storage device, system power is now "off," and bar code reading terminal is now only receiving a small amount of regulated power from the power supply to power the circuitry that monitors the switch.

The fourth and final state is the off state. In this state, the power supply ceases providing regulated power to the bar code reading terminal system, but the state of the terminal system has not been saved to the fixed disk. The off state is virtually identical to typical desktop computers being turned off in the usual manner.

Switching from state to state is handled by the power management driver and is typically based on closure events of a single switch, a flag, and two timers: an Inactivity Standby Timer and Inactivity Suspend Timer. The system has a single power button. This button can be used to turn on the bar code reading terminal system, suspend the state of the terminal system, restore the state of the terminal system, and turn off the terminal system. If the bar code reading terminal is in the normal operating state and the Inactivity Standby Timer expires, the bar code reading terminal system will change to the standby state. In the alternative, the system can provide a means, such as a dialog box, a switch, or other input device, for the user to force the system into the standby state immediately. While in the standby state, any system or user activity, including the user pressing the power button, will cause the bar code terminal to leave the standby state and re-enter the normal operating state.

Wake Up Control & Power Down

In certain low power systems, such as in the battery operated bar code reading terminal and other battery powered devices that are controlled by a digital processor, there are times during which the system is not being actively used or is not actively performing any useful work. During such times, transitioning the system to a sleep state or low power consumption state will preserve battery power while having minimal impact on system performance. The sleep state saves electric power by suspending the operation of the sections, which are not related to the ongoing operation. The status of the bar code reading terminal is saved prior to entering sleep mode; thus, enabling users to resume their work as though the system transition had never occurred. Furthermore, when such systems detect that battery power is below a specified level, switching to a lower power mode of operation will delay the time at which battery power to the system is lost; thus, increasing operation time for the bar code reading terminal.

Several methods can be employed to "wake up" the bar code reading terminal from the sleep state to the normal operating state. For example, a circuit in the microcontroller is configured to cause the system to leave the sleep state and enter the normal operating state when it detects activity in an RF communication link. Such a feature is useful for a system receiving data from a central processing system. The bar code reading terminal enters the normal operating state responsive to the communication activity, performs the preset functions, such as accepting an incoming transmission, uploading or downloading files, allowing remote access to the system, etc., and enters the sleep mode again responsive to the expiration of the Inactivity Suspend Timer, only consuming power while the system is in the normal operating state.

Likewise the microcontroller can implement an alarm counter, which allows an alarm-type event to cause the system to leave the sleep state and enter the normal operating state. Such a system is useful in sending data at a certain time of day, and performing system maintenance functions, such as backing up the system hard drive with a tape backup system. In the latter case, the alarm is set to turn the bar code reading terminal on a fixed period of time before the scheduler causes the tape backup program to be executed. In the alternative, a BIOS scheduler can be used to cause the execution of the tape backup program.

Furthermore, wake up requests can also be in the form of a keyboard interrupt, a UART (universal asynchronous receiver transmitter) interrupt or any event that generates a non-maskable interrupt (NMI). A request to switch from an external processor clock source back to an internal main system clock is also handled in this manner. The wake-up requests are all maskable by manipulating the appropriate bits in a particular register accessible to the microprocessor.

Power down might be accomplished by saving the current system context in stable storage (e.g., battery backed RAM), and then totally powering down all components of the bar code reading terminal other than RAM and the devices used to detect external event signals. Whenever an external event signal is received, the system performs a "warm boot" in which it reloads its context from stable storage and then resumes normal software execution so as to be able to process the external event signal that caused the system to be powered back on.

Alternatively, powering off selected power hungry components, such as mechanical devices, and inhibiting the delivery of clock signals to other devices can accomplish power reduction. Then again, where fast response to external signals is deemed to be especially important, power usage is reduced without fully powering the devices most likely to be needed for responding to the external signals. Rather, the rate of the clock signals to some devices (e.g., CMOS devices) is reduced, for example by a specified factor such as two (or four or any other appropriate clock rate reduction factor). Reducing the rate of the clock signal delivered to a processing unit greatly reduces the power consumed, while still allowing the processor to continue to perform background tasks that use only a small fraction of the system's data processor bandwidth. When a qualifying external event (i.e., one that requires restoring the system to full power) is detected, the power management system changes the rate of the clock signal delivered to the data processor back to its full, normal rate.

Critical Suspend Shutdown

A system can enter into a critical suspend state due to loss of power or critical battery level. Power supplies can fault under certain conditions to protect themselves from internal damage. For example, power line disturbances of certain duration and depth can cause the power supply to fault to protect against over current. The fault condition is latched and can be cleared by either removing the AC power from the power supply (e.g., unplugging the power supply from the wall outlet or turning off the switched power strip supplying AC power to the power supply) or turning off the control signal. Other critical failures can occur in the hardware of the bar code reading terminal. Such hardware can include a fan, a central processing unit (CPU) or memory boards, and/or an I/O bus. Typically, a non-maskable interrupt (NMI) or system management interrupt (SMI) is generated to handle the failure. When an SMI or NMI is asserted, the CPU is aware that a catastrophic failure has occurred which necessitates the shutdown of the computer system.

Furthermore, the bar code reading terminal can include a fault management system, which employs fault detectors associated with circuits to detect faulty operation of and to generate fault state information for the respective circuits. The fault management system further includes a central manager to accumulate the fault state information from the fault detectors, and a system manager to identify which of the circuits is causing faulty operation in a computer system. The fault detectors provide indications to the central manager to indicate faulty operation of one or more circuits. Such indications include interrupt signals transmitted between the fault detectors and the central manager. The fault management system also includes a bus between each fault detector in the central manager to gather information associated with the faulty operation.

Circuits causing faulty operation can automatically be identified by the bar code reading terminal itself. The bar code reading terminal can store information about the source of the faulty operation so that a service provider can quickly perform any necessary maintenance to fix the bar code reading terminal. Understanding the cause of faulty operation allows a manufacturer to modify the design and manufacture of the terminal system to avoid such faulty operation. Using programmable fault detectors allows for greater flexibility in monitoring for faulty operation inside the bar code reading terminal.

Warm Boot and Cold Boot Functions

During operation of the bar code reading terminal, two situations can arise which necessitate booting or rebooting the terminal. In the first situation, the terminal is turned off by a user, or a power failure has occurred, and at some later time the bar code reading terminal is turned back on. At the point when the bar code reading terminal is turned back on, the terminal must be booted before it can respond to commands from the user. Booting in this situation is referred to as a "cold boot." In the second situation, a hardware or software malfunction has occurred in the terminal, and as a result the terminal is no longer responsive to the commands of the user. Power to the bar code reading terminal is not turned off, but the terminal must be rebooted before it will once again respond to user commands. Rebooting in this situation is termed a "warm boot." One significant difference between a warm boot and a cold boot is that a warm boot does not clear data stored in RAM. Consequently, RAM remains a potentially viable booting device for a warm boot, but not for a cold boot. When a warm boot is triggered, the system determines whether a valid copy of the operating system (OS) is already stored in a memory device in the bar code reading terminal. If a valid copy of the OS is stored in the memory device, then the system uses the existing copy rather than unnecessarily copying the entire OS and related files from a remote location. This reduces the time required for the bar code reading terminal to reboot.

However, even in a warm boot, there exists some question about the reliability of RAM as a booting device. The reliability questions are raised by the fact that some hardware or software malfunction has caused the bar code reading terminal to become unresponsive to commands of a user, and in the absence of data, which verifies the integrity of RAM, it remains a possibility that corruption of RAM data is responsible for the malfunction of the terminal. A RAM operation log might be consulted prior to utilizing RAM as a booting device to determine if RAM is in fact responsible for the non-operational state of the terminal, which necessitates the warm booting. Additionally, the hard disk drive and the floppy disk drive can be utilized to verify the reliability of RAM.

A warm boot may be triggered each time a user logs out of the bar code reading terminal. The warm boot after logging out resets the terminal system by clearing the stack and other variables to provide a "clean" system for the next user (i.e., no remaining state information from the previous user). The warm booting procedure is performed quickly such that the next user is not required to wait during a lengthy cold boot procedure.

Serial Ports for RF Communication

The bar code reading terminal can communicate through a serial port with a hardwired network, such as a local area network (LAN) and a wide area network (WAN). Retail stores and warehouses, for example, may use these communications systems to track inventory and replenish stock. The transportation industry may use such systems at large outdoor storage facilities to keep an accurate account of incoming and outgoing shipments. In manufacturing facilities, such systems are useful for tracking parts, completed products, defects, etc. The serial port is used to transfer data to and from the network and can be used as a source or destination of a continuous data flow to a digital signal processor memory. A data flow processor could be programmed to handle the data stream and notify the digital signal processor when a data buffer has been filled or emptied. The port could be addressed by the microcontroller for read or write through the data flow processor.

Furthermore, the bar code reading terminal can communicate with other electronic devices via an RF link implemented by a transceiver, such as a spread spectrum radio transceiver. This transceiver receives characters to be transmitted from the bar code reading terminal via a bus, the characters having been retrieved from the system memory. The RF transceiver acts like a modem in modulating digital data onto a RF carrier as audio tones. An alternative RF transceiver would provide voice communication. Such a transceiver utilizes a speed spectrum signal processor integrated circuit to send either digital data or voice or both to a receiving station. In such an embodiment, the bar code reading terminal would typically have either a built in microphone and speaker or a headset jack for use with a headset/microphone arrangement for two-way voice communication with another user at a receiving station. Typical applications would be use on a factory floor taking inventory of parts located in various places in the factory by scanning barcodes or RF ID tags with voice notes to a second operator located remotely indicating where in the factory various parts are located.

Bluetooth technology can be employed for such wireless RF communication applications. Bluetooth is an open standard for short-range transmission of digital voice and data between mobile devices and desktop devices. It supports point-to-point and multipoint applications. Integrating Bluetooth IP into an ASIC facilitates lower system cost and power consumption.

Matrix Keyboard Scanning

Figure 4:
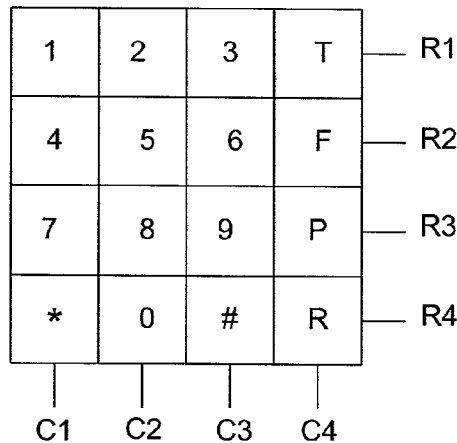
FIG. 4 illustrates a general operation of a matrix keyboard scanning circuit in accordance with one aspect of the present invention.

An electrical keyboard is generally used as a user input interface in the bar code reading terminal. A circuit coupled to the keyboard detects which key is pressed by positive-logic scanning or negative-logic scanning. For instance, in FIG. 4, the keys of a keyboard are arranged matrix-like, where R1 to R4 correspond to row 1 and row 4, and C1 to C4 corresponds to column 1 to column 4. When a key is pressed, its corresponding row line (e.g., R2) and column line (e.g., C3) are connected. In a negative-logic scanning circuit, row lines are first set to a high voltage level with high impedance, and column lines are set to low voltage with low impedance. When a row line is connected to a column line, its voltage level will drop to the low level. The states of the row lines are stored in a latch circuit. After that, column lines are set to the high voltage level with high impedance and row lines are set to the low voltage with low impedance. When the column line is connected to the row line as stated above, its voltage level drops to low level, and the states of the column line are stored in another latch circuit. By reading out the states stored in the latch circuits, the position of the pressed key can be easily determined. The steps described above are typically repeated several times to confirm that the user has intentionally pressed the detected key.

IP Security Hardware

Internet protocol (IP) security provides security to communications over the Internet and within company networks (intranet). The security occurs at the IP protocol layer, thus allowing secure traffic for all application programs without having to make any modifications to the programs themselves. The security is accomplished by either filtering and/or tunneling packets of data.

Filtering is a function in which incoming and outgoing packets of data are accepted or denied based on certain properties. These properties include source and destination addresses, protocol, sub network mask, data type (e.g., TCP/IP (transmission control protocol/internet protocol) data or UDP (user datagram protocol) data etc.), port numbers, routing characteristics, tunnel definition etc. Using a filter, a system administrator may control traffic to and from the bar code reading terminal. For example, employee confidential data may be allowed to be transmitted from host1 to host2 and not vice versa and host3 may be instructed to ignore such data from host1.

Tunneling, on the other hand, is the act of encapsulating or concealing the packets of data as they are traveling over the Internet or a communication link. There are two aspects to data encapsulation. One aspect is authentication and the other is encryption. Authentication requires the receiving host to authenticate the data to ensure that the data did come from the transmitting host. Authentication also guarantees data integrity by using a key digest (akin to a checksum function) to disclose whether the packet arrived at its destination unaltered. Data that has to be authenticated is referenced with an authentication header (AH). Encryption, as the name implies, provides confidentiality by encrypting the data to prevent it from being read by intervening hosts. The receiving host is able to decrypt the data with a key shared with the transmitting host. Data that has been encrypted is referenced with an encryption header (ESP-encapsulating security payload).

When defining a tunnel, a user can choose to encapsulate the entire data packet including IP headers or just the data itself. Encapsulation of only the data allows for faster processing as host systems do not have to decipher the headers to determine whether to transmit, relay, accept or reject the data packet. Encapsulation of only the data is ordinarily done when a trusted network is used.

Some examples of IP security schemes are: SKIP (Simple Key Management for Internet Protocols), ISAKMP (Internet Security Association and Key Management Protocol), and SSL (Secure Sockets layer). IP security protocol (IPSEC), secure sockets layer (SSL), or secure hypertext transport protocol (S-HTTP) are examples of mechanisms that may be used for the protection of the data transfer.

Analog Converters, AC In and Power Good

The bar code reading terminal includes an AC adapter to convert high voltage AC power provided from the AC main, for example, an electrical outlet, to low voltage DC power suitable for use by the terminal. The AC adapter may be external or internal. For example, a cradle includes a power converter for providing power to the cradle via a conventional power cord which plugs into a standard 115 VAC outlet. The AC power which is provided to the cradle via the power cord is input to the converter which converts the AC power received via the power cord to a suitable DC voltage which is provided to power and ground lines. As a result, when the bar code reading terminal is docked in the cradle, the terminal will receive external power from cradle via electrical contacts for operation and/or charging of the batteries.

Figure 5:
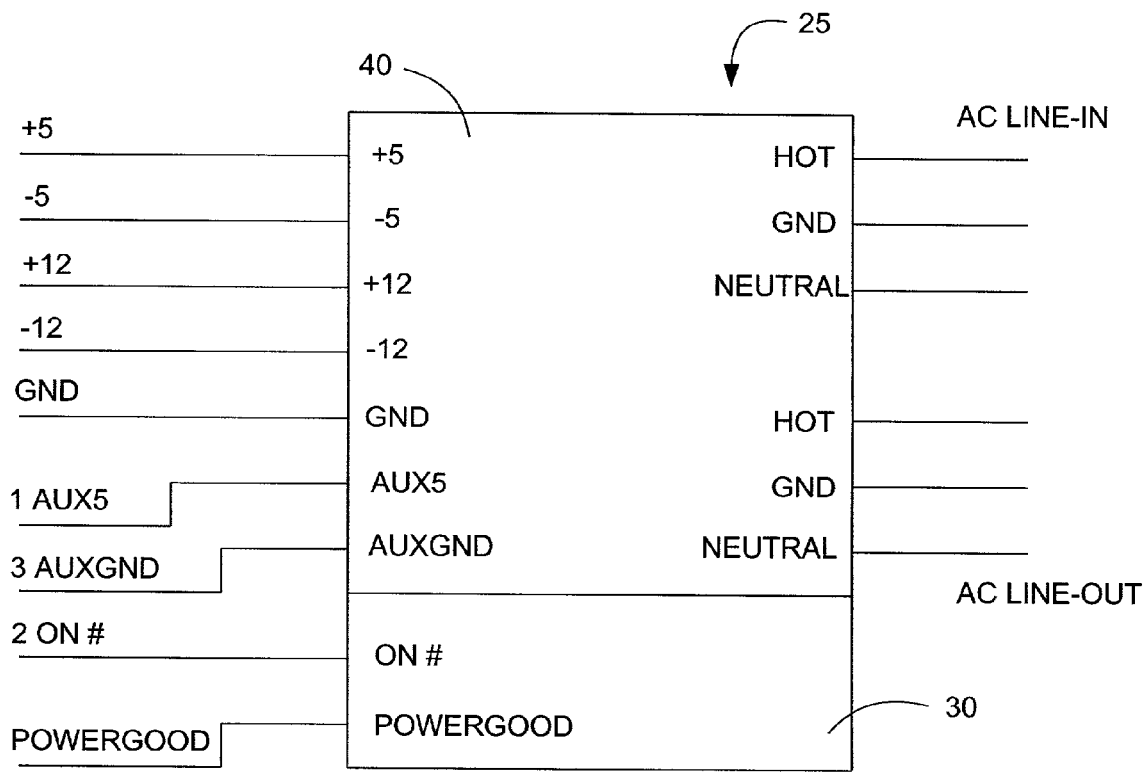
FIG. 5 illustrates a block diagram of a power supply in accordance with one aspect of the present invention.

A block diagram of an exemplary power supply 25 is shown in FIG. 5. The power supply 25 has two units: a control unit 30 and a primary/regulation unit 40. The power supply 25 has several inputs: Line-In, which accepts either 115 VAC or 220 VAC from a typical wall outlet, and ON, which controls the regulation activity of the power supply 25. The power supply 25 has several outputs: AC Line-Out, .+−0.5 VDC, .+−0.12 VDC, AUX5, GND, and POWERGOOD. The AC Line-Out is 115 VAC that is typically passed to an electrical power input a display terminal. The control unit 30 accepts the ON input and generates the POWERGOOD output. The primary/regulation unit 40 selectively regulates the 115 VAC from the Line-In input down to .+−0.5 VDC, .+−0.12 VDC. Whether the primary/regulation unit 40 regulates power at the .+−0.5 VDC and .+−0.12 VDC lines depends on the value of ON, as interfaced by the control unit 30.

When the power supply 25 is "off," that is not providing regulated voltages from the Line-In, the POWERGOOD signal is a logical ZERO. When the power supply 25 is "on," the power supply 25 generates the .+−0.5 VDC and .+−0.12 VDC regulated voltages from the 115 VAC Line-In. These four regulated voltages and their associated GND are the "system power" as is commonly known in the art. When the regulated voltages attain levels within acceptable tolerances, the POWERGOOD signal changes to a logical ONE. Whenever either the +5 or +12 Volt lines fall out of tolerance, the POWERGOOD signal becomes a logical ZERO, thereby indicating this condition.

The AUX5 output provides an auxiliary +5 VDC to the planar. When the power supply 25 is plugged into a typical wall outlet supplying a nominal 115 VAC, the primary/regulation unit 40 provides regulated +5 VDC at AUX5, whether the power supply is "on" or "off." Thus, while receiving AC power, the power supply 25 is always providing a nominal +5 VDC at AUX5. The AUX5 output differs from the +5 output in that the primary/regulation unit 40 only generates regulated +5 VDC through the +5 output while the power supply 25 is "on." The AUX5 output further differs from the +5 output in that in the preferred embodiment, the primary/regulation unit 40 supplies several amps of current at +5 VDC through the +5 output, while the primary/regulation unit 40 supplies less than an amp at +5 VDC though the AUX5 output.

Touch Panel

The bar code reading terminal communicates with the user through a display, which is overlaid with a touch screen. The display can be a conventional liquid crystal display (LCD), such as are used on any laptop computer except scaled to a suitable size. Touch panels provide an interface to access the bar code reading terminal's database without relying on the traditional keyboard-mouse interface. This is advantageous in applications in which the terminal has been programmed to allow the user to step through a menu system to find information. There are several reasons to use a touch panel, including: users can operate the bar code reading terminal with little training; operator errors are reduced; the need for a keyboard and/or mouse are reduced; the terminal can withstand harsh environments where keyboards and mice often become damaged or inoperable; fast access to information is provided; and space is saved since the input device is completely integrated into the display screen.

Coordinates on the touch panel correspond to X and Y positioning information, which are recognized by the processing system of the bar code reading terminal. The touch panel can also provide Z position information into the processing system. Such Z information may provide an indication of the amount of pressure that is applied to the touch panel. A user generates X, Y, and Z inputs to the processing system by physically touching a portion of the surface of the touch panel. The touch panel then generates control signals in response to the physical contact.

The touch panel may comprise a resistive touch panel, which includes two sheets of clear conductive material forming a pair of clear conductive layers in front of the display screen. When the user presses on the top layer, the electrical resistance between the two layers is altered. The user presses on the top layer of the touch panel with either a pen or finger. Alternatively, the touch panel may comprise a capacitive touch panel, which includes a sheet of clear conductive material positioned in front of the display screen. When the user presses on the clear conductive material, the electrical capacitance of the conductive material is altered. Similarly, the user presses on the capacitive layer of the touch panel with either a pen or finger. Alternatively, the touch panel may comprise an inductive touch screen. The inductive touch screen is positioned in front of the display screen or behind the display screen. The user positions a pen near the surface of the touch panel to induce electrical signals in the touch panel.

The touch screen may be used to power down the system and/or wake the system from a standby and/or sleep state. An internal timer may be set to transition the bar code reading terminal from a normal operating state to a standby, sleep, or off state if the touch panel does not sense a touch input for a predetermined period of time.

Smart Batteries and Dumb Batteries: Gas Gauging, Cycle Life, Charge Control

In the field of battery charging systems, there are two main types of battery power systems, "smart batteries" and "dumb batteries". Dumb batteries are simply batteries with no processing or memory storage capabilities. In contrast, smart batteries include some type of processing or memory storage capability. In general, batteries of different types, characterized by chemical components, such as Alkaline, Lithium (Li) Ion, nickel cadmium (Ni—Cd), nickel metal hydride (Ni-MH), etc., exhibit different charge/discharge characteristics. Further, such batteries may be classified into smart batteries with self-battery control function and dumb batteries without self-battery control function.

A smart battery can include a system that will ensure that the battery fully charges the battery pack each time it is charged. The system includes charging algorithms that will eliminate voltage depression, dendrite shorts, and any other problem that could keep the battery from fully charging. This ensures that the battery will run as long as possible. These algorithms also take into account the individual usage pattern of the end user. The system is also to increase the cycle life of the battery by charging the battery in the least destructive manner possible. This charging method is dependent on many factors such as the environment the battery is used in, the application the battery is used in, the cell type and manufacturer of the battery, the age of the battery (time and cycles), and the required charge time. Another important function of the present invention is to provide feedback to the user, via the display screen.

Furthermore, the smart battery can determine a desired charging voltage and desired charging current based on measured environment conditions, such as battery temperature, and the charging characteristics. The smart battery includes clock and data terminals, which provide a communication interface to the data and clock lines of a system bus, respectively, as well as positive and negative power terminals.

The bar code reading terminal can display to the user the amount of charge left in the battery. Furthermore, the smart battery can store information to provide the manufacturer with diagnostics and data of the battery in the event that the battery is returned to them. Such information may include the number of cycles on the battery; the last capacity of the battery; the highest current draw the battery supplied and for how long; the highest and lowest temperatures the battery was exposed to; the cell type, size, manufacturer, and date code; the manufacturing date code of battery; the identification of the customer that purchased this battery; and the failure mode.

A dumb battery's terminal configuration is generally different from that of a smart battery as will be shown with respect to FIGS. 6-9. However, dumb batteries and smart batteries can be interchangeably used to provide power for the bar code reading terminal. Thus, the terminal equipment is able to automatically recognize the type of a battery, which is installed in the bar code reading terminal. This knowledge of the battery type may be useful to the equipment in establishing charging parameters such as the charging rate of the battery or in warning a user of a low battery condition.

Figure 6:
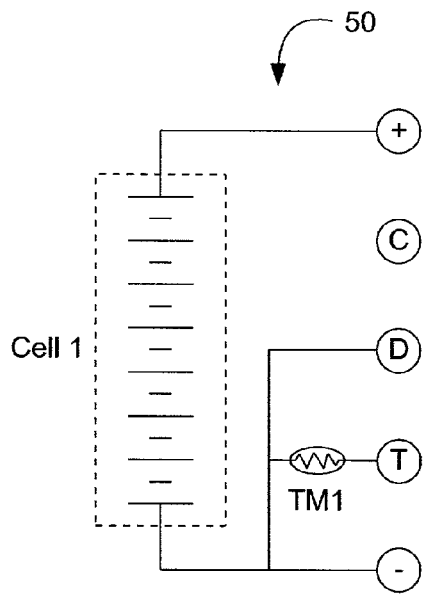
FIG. 6 illustrates a dumb Ni-MH battery circuit in accordance with one aspect of the present invention.

Referring to FIG. 6, the positive and negative terminals of a Ni-MH dumb battery 50 are connected to positive and negative ends of Ni-MH battery cells 'Cell1' coupled in series, respectively. The first detection terminal (i.e., clock terminal) 'C' of the battery 50 is open-circuited. The second detection terminal (i.e., data terminal) 'D' of the battery 50 is commonly connected to the negative end of the cells along with the negative terminal '−' thereof. The third detection terminal (i.e., temperature detection terminal) 'T' of the battery 50 is connected to the negative terminal '−' thereof (or, the negative end of the cells) via a temperature sensor TM1, such as a thermistor, a thermocouple, a semiconductor temperature sensor, or other temperature sensing device, that produces an analog signal proportional to the sensed temperature.

Figure 7:
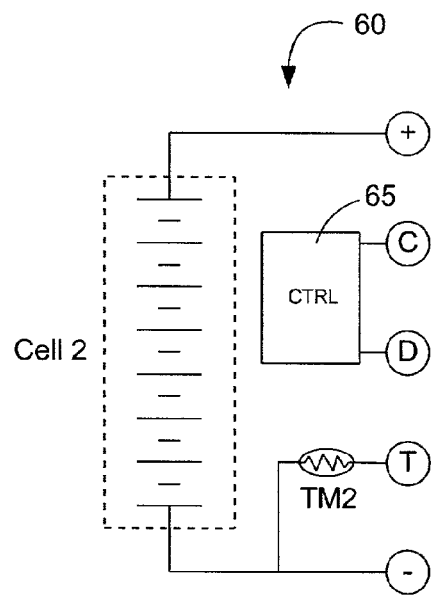
FIG. 7 illustrates a smart Ni-MH battery circuit in accordance with one aspect of the present invention.

Referring to FIG. 7, the positive and negative terminals of a Ni-MH smart battery 60 are connected to positive and negative ends of Ni-MH battery cells 'Cell2' also coupled in series, respectively, like those of the Ni-MH dumb battery 50. The smart battery 60 includes a microcontroller 65. The controller 65 is physically embedded in the battery 60 so as to perform self-battery control. The first detection terminal 'C' of the smart battery 60 is connected to the clock line of the microcontroller 65. The second detection terminal 'D' of the battery 60 is connected to the data line of the controller 65. The third detection terminal 'T' of the battery 60 is connected to the negative terminal '−' thereof (or, the negative end of the cells) via a temperature sensor TM2, like the Ni-MH dumb battery 50.

Figure 8:
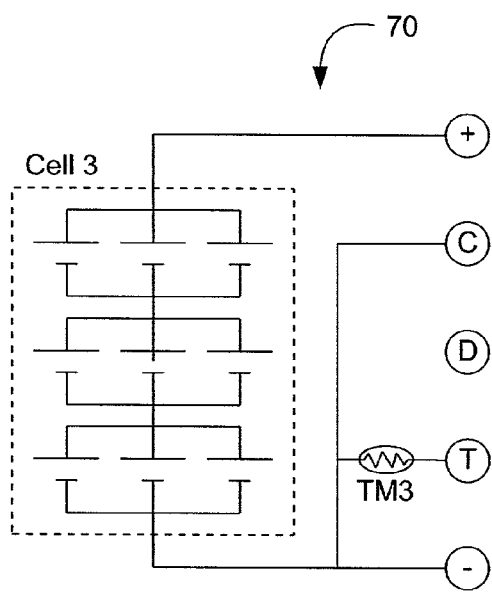
FIG. 8 illustrates a dumb Li-Ion battery circuit in accordance with one aspect of the present invention.

Referring to FIG. 8, the positive and negative terminals of a Li-Ion dumb battery 70 are connected to positive and negative ends of Li-Ion battery cells 'Cell3' coupled in series/parallel combination, respectively. The first detection terminal 'C' of the battery 70 is commonly connected to the negative end of the cells along with the negative terminal '−' thereof. The second detection terminal 'D' of the battery 70 is open-circuited. The third detection terminal 'T' of the battery 70 is connected to the negative terminal '−' thereof (or, the negative end of the cells) via a temperature sensor TM3.

Figure 9:
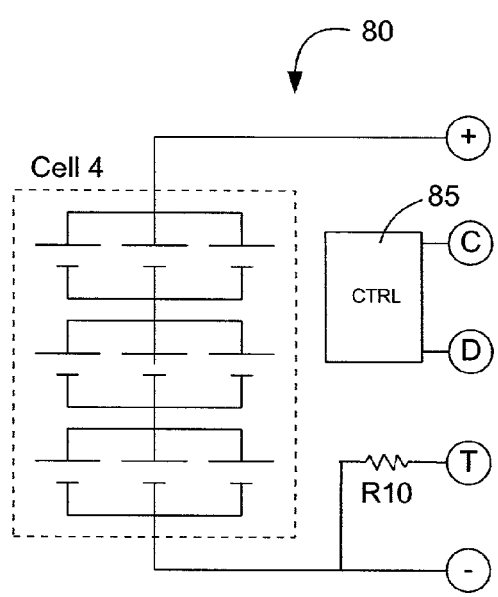
FIG. 9 illustrates a smart Li-Ion battery circuit in accordance with one aspect of the present invention.

Referring to FIG. 9, the positive and negative terminals of a Li-Ion smart battery 80 are connected to positive and negative ends of Li-Ion battery cells 'Cell4' coupled in series/parallel combination, respectively, like those of the Li-Ion dumb battery 70. The smart battery 80 also includes a built-in microcontroller 85 for performing self-battery control. The first detection terminal 'C' of the smart battery 80 is connected to the clock line of the microcontroller 85. The second detection terminal 'D' of the battery 80 is connected to the data line of the controller 85. The third detection terminal 'T' of the battery 80 is connected to the negative terminal '−' thereof (or, the negative end of the cells) via a resistor R10.

Modular Memory IDE Interface: NAND Memory, CF Cards

IDE (Integrated Drive Electronics) is a standard electronic interface used between bar code reading terminal motherboard's data paths or bus and the disk storage devices. The disk drive controller of the IDE interface is built into the logic board in the disk drive. The IDE interface in the bar code reading terminal provides an interface for NAND memory and Compact Flash (CF) cards.

The CF card is a small format flash memory card that is 36 mm×43 mm×3.3 mm, the surface area of which is approximately ⅓ the surface area of the standard PC Card. The CF card is employed as a memory storage medium for the bar code reading terminal. For example, bar code data may be stored in a CF card preparatory to transfer to a host computer. The transfer may occur by wireless communication, i.e. radio frequency communication, an infrared signal, or use of a modem.

Figure 10:
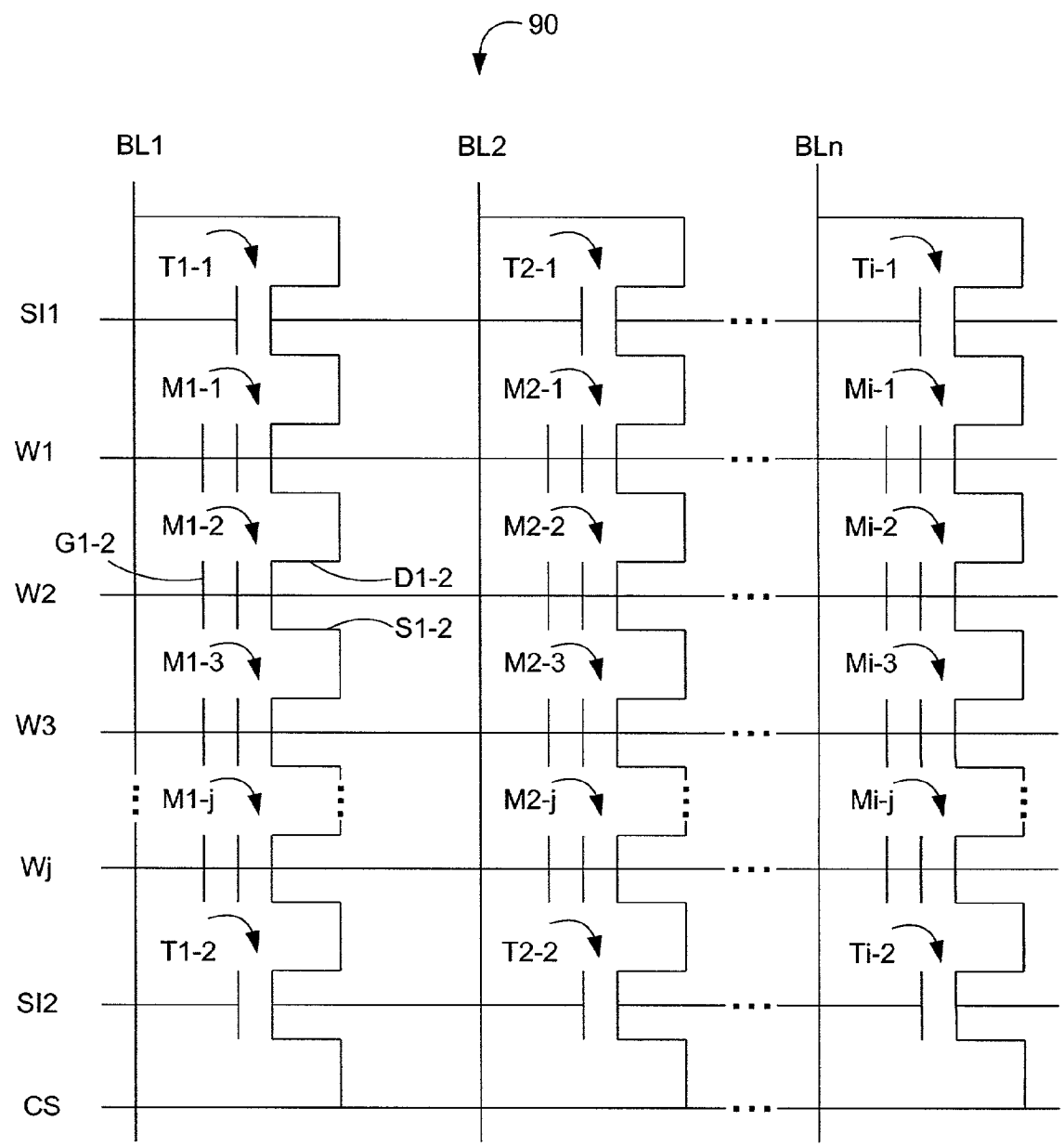
FIG. 10 illustrates a NAND type flash memory array in accordance with one aspect of the present invention.

FIG. 10 schematically illustrates a NAND type flash memory array 90 that includes numerous memory cells. A string includes a selection transistor Ti-1, memory transistors Mi-1 to Mi-j, and a selection transistor Ti-2, all being serially coupled. Each string can be coupled to a bit line BLj and a common source CS through selection transistors Ti-1, and Ti-2, respectively. The control gates for selection transistors Ti-1 and Ti-2 are respectively connected to selection lines SI1 and SI2. The control gates for the memory transistors Mi-1 to Mi-j are respectively connect to word lines W1 to Wj. Typically, a read operation is performed on a page basis, i.e., flash memory cells coupled to a word line are read together.

A large variation in the programming and erasing characteristics of individual NAND type flash memory transistors among a memory array is common. The variation can be due to structural differences, which cause difference in threshold voltage characteristics. Such variations introduce differences in programming and erasing speeds among memory transistors. NAND type flash memory arrays 90 can use fixed or user-controlled programming and erase voltages, depending upon the application.

Imaging Support

The portable data collection device includes a two dimensional (2D) charge coupled device (CCD) photosensor array imaging assembly which is capable of imaging a target object located within an imaging target area of the imaging assembly. A target object may be a dataform, a signature, or a specific item or document to be imaged. The imaging system may employ binarization and zoning processes when operating in the dataform reading mode or the signature area capture mode to result in a more efficient and effective reading of a target dataform or capturing the image of a target signature area. The imaging assembly is capable of decoding a one dimensional bar code dataform such as Codabar, Code 39, Code 93, Code 128, Interleaved 2 of 5, and UPC/EAN; a two dimensional bar code dataform such as PDF417 and SuperCode; or a matrix dataform such as MaxiCode and DataMatrix.

The image reading device includes a linear image sensor, such as a CCD sensor, which includes a predetermined number of photodiodes (representing pixels) arranged in a line and aligned in a predetermined direction. The image reading device also includes an imaging lens for forming an image on the image sensor. The image sensor captures an image of one line (a scanning line) of the object and the scanning system operates to scan the object with the linear image sensor such that the linear image sensor captures a plurality of scanning lines until an image of the entire object is captured.

The image reading device can also be combined with the image sensor as a scanning unit. The scanning system then operates such that either the scanning unit is driven to scan the object ("flatbed scanner") or the object is driven such that it is scanned by the scanning unit ("portable-style scanner"). In the first case, the object is placed, for example, on a transparent plate, and then the scanning unit is moved relative to the transparent plate. Generally, the transparent plate is located closer to the scanning unit, and the range of movement of the scanning unit must generally be as large as the object such that such an image-reading device is large and bulky. In the second case, since the object is moved past the scanning unit, a structure for moving the object must be provided. A well-known example of such a scanner is generally provided with a sheet feeder, and the object is generally a sheet of paper. Also in this case, the object moves past at a relatively close position to the scanning unit. Another type of scanning system with which an image of an object apart from the scanning system can be captured is a "camera-style scanner". In such a scanning system, an imaging lens is provided that forms an image of the entire object and then the image sensor is moved along a line representing the position of the image formed by the imaging lens.

Fingerprint Reader

A circuit for a fingerprint reader may be included in the ASIC of the bar code reading terminal to provide an identification probability for a match of a fingerprint to a prerecorded fingerprint held in a database. An individual may place their finger over a recognition reader wherein the reader scans the fingerprint, codes the image, and transmits the fingerprint code by infrared (IR) or radio frequency (RF) transmission to a receiver located on the item to be secured. For example, a fingerprint recognition device may be employed to detect whether a particular user has access to specified functions of the terminal. In this manner, only individuals that have authorized access to would have their fingerprint scanned into a memory module stored in the terminal. Furthermore, the fingerprint reader may have the capability for the wireless transmission of fingerprint images captured to a central facility for identity verification using an automated fingerprint identification system.

Alternatively, or additionally, a digital camera may simulate the scan pattern of the fingerprint reader. The simulation includes the steps of extracting linear stripes of pixels from the image, and concatenating them together. The stripes are typically 1-3 pixels wide, 100-2000 pixels long, and oriented in several different directions. This renders the feature vector less dependent on the orientation of the fingerprint. The fingerprint image may be taken in real time or may be previously prepared image.

USB Host

The USB IO system manages the dynamic attach and detach of peripherals. This phase, called enumeration, involves communicating with the peripheral to discover the identity of a device driver that it should load, if not already loaded. A unique address is assigned to each peripheral during enumeration to be used for run-time data transfers. During run-time, the host bar code reading terminal initiates transactions and responds accordingly. Additionally, the terminal's software incorporates the peripheral into the system power management scheme and can manage overall system power without user interaction.

A hub provides additional connectivity for USB peripherals. The hub also provides managed power to attached peripherals. It recognized dynamic attachment of a peripheral and provides at least 0.5W of power per peripheral during initialization. Under control of the host terminal's software, the hub may provide more device power. A newly attached hub will be assigned its unique address, and hubs may be cascaded up to five levels deep. During run-time, a hub operates as a bi-directional repeater and will repeat USB signals as required on upstream (towards the host) and downstream (towards the device) cables. The hub also monitors these signals and handles transactions addressed to itself. All other transactions are repeated to attached devices.

USB peripherals are slaves that obey a defined protocol. They react to request transactions sent from the host bar code reading terminal. The peripheral responds to control transactions that, for example, request detailed information about the device and its configuration. The peripheral sends and receives data to and from the host using a standard USB data format. This standardized data movement to and from the terminal host and interpretation by the peripheral gives USB its enormous flexibility with little host software changes.

Magnetic Stripe Interface

Magnetic heads of a magnetic stripe reader are coupled to a magnetic stripe reader interface circuit. The magnetic heads read a magnetic stripe on the back of a card. The magnetic stripe card reader then sends the data to the bar code reading terminal where it is recorded in system memory. This can be done preferably by sending the card data to the base unit via the infrared transceiver and from there via a LAN interface or RF link built into the base unit to the host terminal. This leaves the memory card slot free to read the card. In other embodiments, the card data is sent to the host computer via a LAN interface or RF LAN link to the host computer built onto a memory card card.

Figure 11:
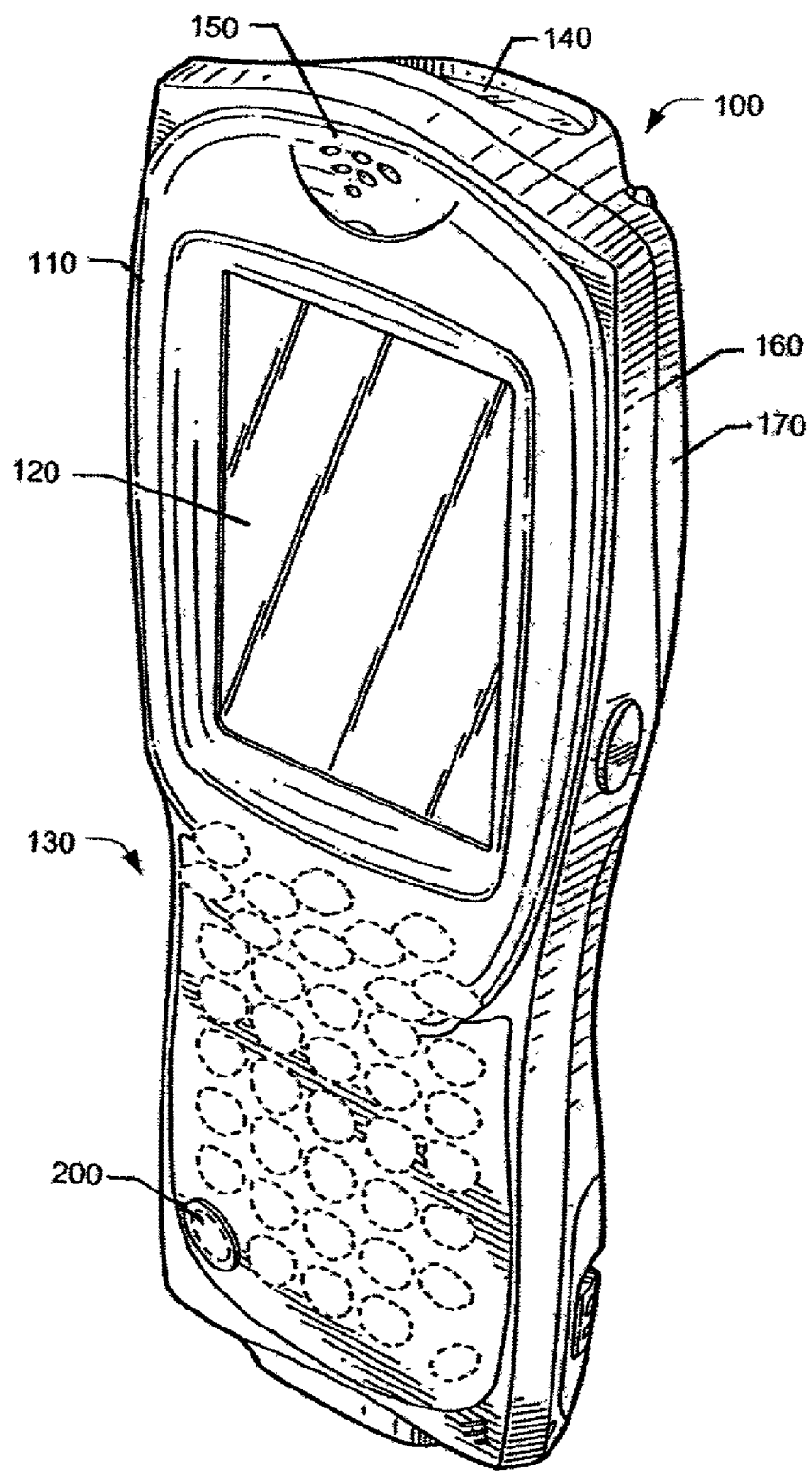
FIG. 11 illustrates a front view of a hand held portable electronic device in accordance with one aspect of the present invention.
Figure 12:
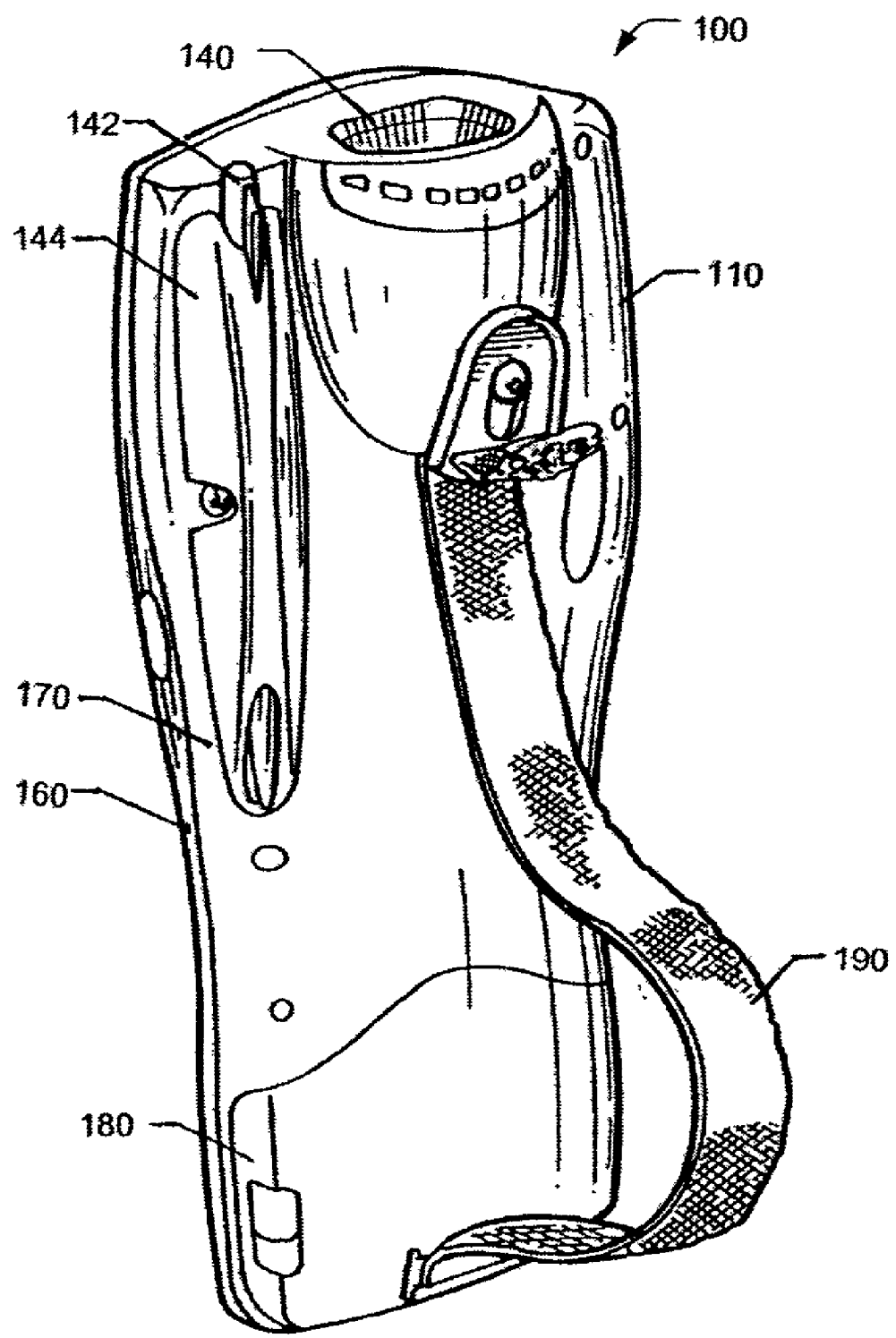
FIG. 12 illustrates a back view of a hand held portable electronic device in accordance with one aspect of the present invention.

Turning now to FIGS. 11 and 12, pictorial representations of front and back views, respectively, of a portable electronic device are shown. In this example, the portable electronic device is a hand-held terminal 100 used in a wireless communication network for tracking inventory, storing data, etc. The user may input and/or process data via a keypad, bar code scanner, etc. independent of the hand-held terminal 100 being connected to a LAN or WAN, for example. When the hand-held terminal 100 does not include a radio to provide for real time communications of data to a LAN or WAN, the data is stored in memory within the hand-held terminal 100. In such circumstances, when the hand-held terminal 100 is eventually connected to a LAN or WAN, the data can be transmitted to a host computer (not shown). It will be appreciated that the portable device could also be any other device that is portable in nature and having electronic circuitry therein in accordance with the present invention. For example, the portable device could be a laptop computer or notebook computer, a PDA, or even a cellular telephone or pager, which employs rechargeable batteries.

The hand-held terminal 100 includes a housing 110, a touch screen 120 for displaying information to a user and allowing the user to input information and/or operational commands, a set of user interface keys 130 for allowing the user to input information and/or operational commands and a bar code reader 140. A pen 142 and pen clip 144 (FIG. 12) can also be included for use with the touch screen 120. The bar code reader 140 is adapted to read information on a bar code label or the like. The hand-held terminal 100 can include a LED that is illuminated to reflect whether the bar code has been properly or improperly read. The described components 120, 130 and 140 are located in the housing 110 that is an elongated enclosure of a size and includes such contours as to conveniently fit into the open palm of the user.

Also located in the housing 110, is a speaker 150 for receiving and transmitting audio signals. The housing 110 may be comprised of a number of shell portions such as for example front and rear shells 160 and 170 as well as a battery pack lid 180 (FIG. 12). The ASIC can be located between the front and rear shells 160 and 170 or within a portion of the battery compartment. Furthermore, the hand-held terminal 100 can be configured to facilitate the removal of the ASIC, which allows ASICs to be switched in and out of the hand-held terminal 100. The housing 110 may also include a hand strap 190 (FIG. 12) for user comfort. The user interface keys 130 may include a fill alphanumeric keypad, function keys, enter keys, etc. The hand-held terminal 100 includes a window through which the bar code reader 140 is able to read a bar code label presented to the hand-held terminal 100. Also included in the hand-held terminal 100 is an ON/OFF power key 200 for turning the device on and off.

Although the invention has been shown and described with respect to a certain preferred aspect or aspects, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary aspect or aspects of the invention. In addition, while a particular feature of the invention may have been described above with respect to only one of several aspects, such feature may be combined with one or more other features of the other aspects, as may be desired and advantageous for any given or particular application. Furthermore, to the extent that the term "includes" is used in either the detailed description or the claims, such term is intended to be inclusive in a manner similar to the term "comprising".

What is claimed is:

1. A portable electronic device comprising:
   an image capture device coupled to the portable electronic device;
   a laser scanner coupled to the portable electronic device;
   an application specific integrated circuit (ASIC) comprising circuitry for communicating with the image capture device and the laser scanner, and circuitry for carrying out smart and dumb battery function including a gas gauging function; and
   a common bus that provides a hardware path from the ASIC to a processor.

2. The portable electronic device of claim 1, further comprising a data blender adapted to receive data from the image capture device and the laser scanner and distribute the data to multiple destinations based on a type or content of the data.

3. The portable electronic device of claim 1, the portable electronic device being a bar code reading terminal.

4. The portable electronic device of claim 1, the ASIC further comprising circuitry for carrying out at least one of the following functions:
- power management;
- wake up control and power down;
- critical suspend shutdown;
- warm boot and cold boot;
- serial port for WAN radio;
- matrix keyboard scanning;
- IP security;
- analog converters;
- touch panel;
- modular memory IDE interface;
- fingerprint reader;
- USB host; and
- magnetic stripe interface.

5. The ASIC of claim 1, the smart and dumb battery function including a cycle life function.

6. The ASIC of claim 1, the smart and dumb battery function including a charge control function.

7. The ASIC of claim 1, the smart and dumb battery being a Ni-MH battery.

8. The ASIC of claim 1, the smart and dumb battery being a Li-Ion battery.

9. The ASIC of claim 4, the modular memory IDE interface function including a NAND memory function.

10. The ASIC of claim 4, the modular memory IDE interface function including a CF card function.

11. The portable electronic device of claim 1, the common bus allows data decoded off line to be processed while a current task is implemented.

12. The portable electronic device of claim 1, the common bus provides shared data path from the imager and the laser scanner into a memory.

13. The portable electronic device of claim 1, the data from the imager and the laser scanner is at least one of biometrics data, magstripe data, and RFID data.

14. The portable electronic device of claim 1, a data source coupled to the portable electronic device, the data source communicates with the portable electronic device via the ASIC circuitry.

15. A portable data collection device, comprising:
- an application specific integrated circuit (ASIC) that accepts data from at least one source coupled to the portable data collection device, wherein the ASIC comprises circuitry for carrying out smart and dumb battery function including a gas gauging function; and
- a data blender that distributes the data from the at least one source to a first destination based on the type of data, the content or the data, or combinations thereof.

16. The system of claim 15, the data from the at least one source is decoded within the portable data collection device.

17. The device of claim 15, the data from the at least one source is decoded offline and processed on the portable data collection device at a later time.

18. The device of claim 15, the data from the at least one source is routed through a common driver.

19. The device of claim 15, the data from the at least one sources is biometrics data, magstripe data, RFID data, or combinations thereof.

* * * * *